United States Patent
Alvi et al.

(10) Patent No.: US 11,689,138 B2
(45) Date of Patent: Jun. 27, 2023

(54) REDUCED CONTROL CYCLE CURRENT REGULATOR FOR VEHICLE ELECTRIC TRACTION MOTOR

(71) Applicant: GM Global Technology Operations LLC, Detroit, MI (US)

(72) Inventors: Muhammad Hussain Alvi, Troy, MI (US); Lei Hao, Troy, MI (US); Suresh Gopalakrishnan, Troy, MI (US); Bojian Cao, Troy, MI (US); Vinod Chowdary Peddi, Shelby Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 17/381,906

(22) Filed: Jul. 21, 2021

(65) Prior Publication Data

US 2023/0022957 A1    Jan. 26, 2023

(51) Int. Cl.
*H02P 27/08* (2006.01)
*B60L 50/60* (2019.01)
*B60K 6/22* (2007.10)

(52) U.S. Cl.
CPC .............. *H02P 27/08* (2013.01); *B60K 6/22* (2013.01); *B60L 50/60* (2019.02); *B60L 2210/42* (2013.01); *B60Y 2200/91* (2013.01); *B60Y 2200/92* (2013.01); *B60Y 2400/61* (2013.01)

(58) Field of Classification Search
CPC .......... H02P 21/22; H02P 27/08; H02P 27/06; B60L 50/51; B60L 2240/423; B60L 9/18; B60L 2240/443; B60L 2240/529; B60Y 2200/91
See application file for complete search history.

(56) References Cited

U.S. PATENT DOCUMENTS

| | | | |
|---|---|---|---|
| 7,268,514 B2* | 9/2007 | DeLange | B66B 5/0031 318/369 |
| 9,503,010 B2* | 11/2016 | Kim | H02P 21/141 |
| 10,744,879 B2* | 8/2020 | Campbell | B60L 3/0023 |
| 2009/0267555 A1* | 10/2009 | Schulz | H02P 29/50 318/432 |
| 2010/0295500 A1* | 11/2010 | Chakrabarti | H02P 21/09 180/65.285 |
| 2014/0225548 A1* | 8/2014 | Xu | H02P 21/13 318/400.33 |
| 2015/0236632 A1* | 8/2015 | Marohl | H02P 23/0077 318/722 |
| 2020/0031233 A1* | 1/2020 | Campbell | B60L 3/003 |

* cited by examiner

*Primary Examiner* — Thai T Dinh
(74) *Attorney, Agent, or Firm* — Cantor Colburn LLP

(57) ABSTRACT

A system in a vehicle includes a current regulator to obtain current commands from a controller based on a torque input and provide voltage commands and an inverter to use the voltage commands from the current regulator and direct current (DC) supplied by a battery to provide alternating current (AC). The system also includes an electric traction motor to provide drive power to a transmission of the vehicle based on injection of the AC from the inverter. The current regulator adjusts parameters of a transfer function implemented by the current regulator, based on feedback of an input to and an output from the electric traction motor to achieve the AC corresponding with the torque input in no more than two control cycles.

20 Claims, 3 Drawing Sheets

REDUCED CONTROL CYCLE CURRENT REGULATOR FOR VEHICLE ELECTRIC TRACTION MOTOR

INTRODUCTION

The subject disclosure relates to a reduced control cycle current regulator for a vehicle electric traction motor.

A vehicle (e.g., automobile, truck, construction equipment, farm equipment) that is a battery electric vehicle (BEV) or an electric hybrid vehicle uses a traction motor, which is an electric motor, for propulsion instead of or in addition to an internal combustion engine. The traction motor may be an interior permanent magnet (IPM) motor with magnets embedded in the rotor. As a result, while a surface permanent magnet motor has a permanent magnet attached to the rotor surface and only uses magnetic torque from the magnet, the IPM motor uses reluctance through magnetic resistance in addition to magnetic torque. A torque input (e.g., via an accelerator pedal operated by a driver) is used to convert direct current (DC) from the vehicle battery to an alternating current (AC) to the IPM motor to achieve the torque requested by the torque input. This torque is supplied to the power transfer unit that turns the wheels. The traction motor drive system includes a current regulator between the torque input and the IPM motor. Accordingly, it is desirable to provide a reduced control cycle current regulator for a vehicle electric traction motor.

SUMMARY

In one exemplary embodiment, a system in a vehicle includes a current regulator to obtain current commands from a controller based on a torque input and provide voltage commands and an inverter to use the voltage commands from the current regulator and direct current (DC) supplied by a battery to provide alternating current (AC). The system also includes an electric traction motor to provide drive power to a transmission of the vehicle based on injection of the AC from the inverter. The current regulator adjusts parameters of a transfer function implemented by the current regulator, based on feedback of an input to and an output from the electric traction motor to achieve the AC corresponding with the torque input in no more than two control cycles.

In addition to one or more of the features described herein, the current regulator changes the transfer function based on the feedback.

In addition to one or more of the features described herein, the system also includes a forward prediction filter to obtain the feedback of the input to the electric traction motor and provide a prediction of direct-axis current $I_d$ and quadrature-axis current $I_q$ in a next control cycle to the current regulator.

In addition to one or more of the features described herein, the system also includes a differentiator to obtain the feedback of the output from the electric traction motor and provide a shaft speed of the electric traction motor to the controller and the current regulator.

In addition to one or more of the features described herein, the current regulator includes look-up tables or polynomial functions to provide inductance values to adjust the parameters of the transfer function based on the direct-axis current $I_d$ and the quadrature-axis current $I_q$ from the forward prediction filter or based on the current commands from the controller.

In addition to one or more of the features described herein, the look-up tables or the polynomial functions are based on measurements taken for the electric traction motor.

In addition to one or more of the features described herein, the current regulator includes look-up tables or polynomial functions to provide a resistance value to adjust the parameters of the transfer function based on the shaft speed of the electric traction motor.

In addition to one or more of the features described herein, the current regulator includes a look-up table to mitigate speed dependent error in the control of direct-axis current $I_d$ and quadrature-axis current $I_q$.

In addition to one or more of the features described herein, the inverter includes a pulse width modulator (PWM) configured to convert the voltage commands from the current regulator to three-phase inverter voltage control signals.

In addition to one or more of the features described herein, the inverter also includes a DC to AC converter configured to obtain the three-phase voltage commands from the PWM and the DC from the battery to provide three-phase AC current to the electric traction motor.

In another exemplary embodiment, a method in a vehicle includes configuring a current regulator to obtain current commands from a controller based on a torque input and provide voltage commands and arranging an inverter to use the voltage commands from the current regulator and direct current (DC) supplied by a battery to provide alternating current (AC). The method also includes positioning an electric traction motor to provide drive power to a transmission of the vehicle based on injection of the AC from the inverter. The current regulator adjusts parameters of a transfer function implemented by the current regulator, based on feedback of an input to and an output from the electric traction motor to achieve the AC corresponding with the torque input in no more than two control cycles.

In addition to one or more of the features described herein, the configuring the current regulator includes changing the transfer function based on the feedback.

In addition to one or more of the features described herein, the method also includes arranging a forward prediction filter to obtain the feedback of the input to the electric traction motor and to provide a prediction of direct-axis current $I_d$ and quadrature-axis current $I_q$ in a next control cycle to the current regulator.

In addition to one or more of the features described herein, the method also includes arranging a differentiator to obtain the feedback of the output from the electric traction motor and to provide a shaft speed of the electric traction motor to the controller and the current regulator.

In addition to one or more of the features described herein, the configuring the current regulator includes configuring look-up tables or polynomial functions to provide inductance values to adjust the parameters of the transfer function based on the direct-axis current $I_d$ and the quadrature-axis current $I_q$ from the forward prediction filter or based on the current commands from the controller.

In addition to one or more of the features described herein, the configuring the look-up tables or the polynomial functions includes basing the look-up tables or the polynomial functions on measurements taken for the electric traction motor.

In addition to one or more of the features described herein, the configuring the look-up tables or polynomial functions provides a resistance value to adjust the parameters of the transfer function based on the shaft speed of the electric traction motor.

In addition to one or more of the features described herein, the configuring the current regulator includes configuring a look-up table to mitigate speed dependent error in the control of direct-axis current $I_d$ and quadrature-axis current $I_q$.

In addition to one or more of the features described herein, the arranging the inverter includes arranging a pulse width modulator (PWM) to convert the voltage commands from the current regulator to three-phase inverter voltage control signals.

In addition to one or more of the features described herein, the arranging the inverter also includes arranging a DC to AC converter to obtain the three-phase voltage commands from the PWM and the DC from the battery to provide three-phase AC current to the electric traction motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
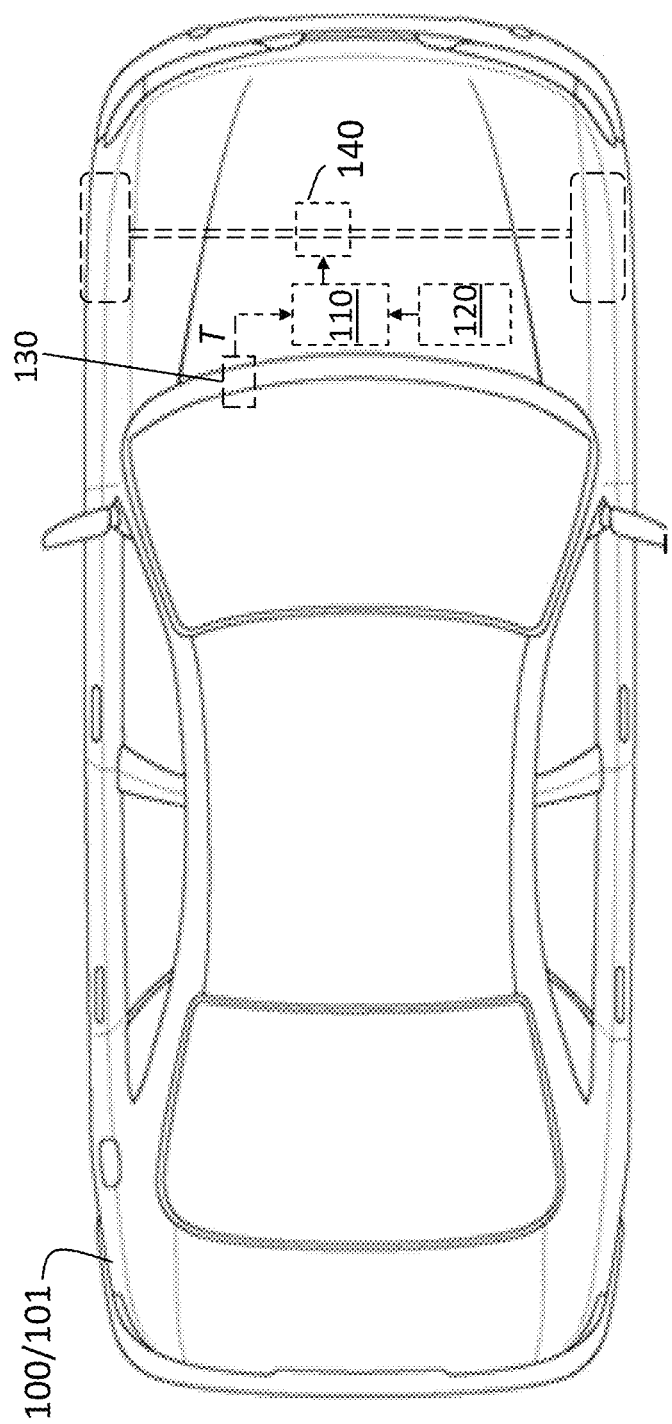
FIG. 1 is a block diagram of a vehicle with a reduced control cycle current regulator for the electric traction motor according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a traction system with an IPM motor is used for propulsion in a BEV or hybrid vehicle. According to a prior approach, the transfer function used in a current regulator between the torque input and the IPM motor does not account for the fact that some IPM parameters are operating point-dependent and change with current injection. As a result, the prior discrete control strategy may require multiple beats (i.e., control cycles) to achieve the current commands to the IPM required for the requested torque, with overshoot and steady state error also possible. This can result in lag, jerk, and/or vibration between an operator or an autonomous system generating a torque command (e.g., operator pushing the accelerator pedal) and implementation of the command as compared with a gas-only engine. Embodiments of the systems and method detailed herein relate to a reduced control cycle current regulator for the electric traction motor. Specifically, the current regulator uses a model inverse method to account for operating point dependence and to correct saturation effect in the IPM. Saturation effect refers to the condition in which magnetic material of the motor may get saturated in magnetic flux such that flux no longer increases linearly with current input. The model inverse method may use parameter lookup tables (LUTs) or polynomial fitting, as detailed. The result is that current response (i.e., the current commands provided to the electric traction motor (e.g., IPM) corresponding to the requested torque) may be achieved in as little as one control cycle.

Figure 2:
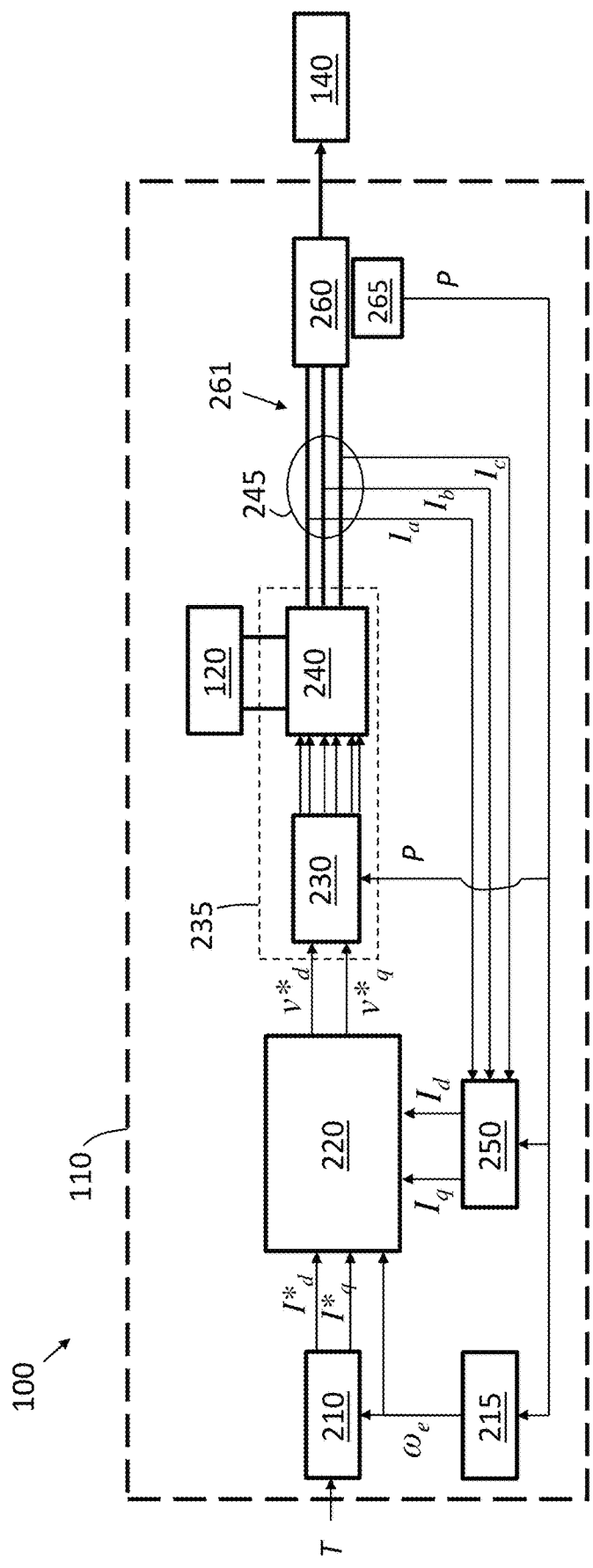
FIG. 2 is a block diagram detailing aspects of the electric traction system that includes a reduced control cycle current regulator for the electric traction motor according to one or more embodiments.

In accordance with an exemplary embodiment, FIG. 1 is a block diagram of a vehicle 100 with a reduced control cycle current regulator 220 (FIG. 2) for the electric traction motor 260 (FIG. 2). The exemplary vehicle 100 shown in FIG. 1 is an automobile 101. The electric traction system 110, which includes the electric traction motor 260 (e.g., IPM) and current regulator 220 (FIG. 2), is coupled to a battery 120 that supplies DC and to a transmission 140, which transfers power to the drive wheels. The transmission 140 may be a hybrid transmission in the case of a gas-electric hybrid vehicle 100. The electric traction system 110 receives a torque input T originating from an input source 130 (e.g., accelerator pedal 130 in a driver-operated vehicle 100).

The electric traction system 110, which is further detailed in FIG. 2, includes a current regulator 220 that provides voltage commands to a pulse width modulator (PWM) 230. As detailed in FIG. 3, this current regulator 220 is designed to account for operating point dependence of the electric traction motor 260. Specifically, the current regulator 220 controls the three-phase AC 261 (FIG. 2) that is injected into the electric traction motor 260 to affect the torque that produces drive power at the output of the electric traction motor 260. According to one or more embodiments, this three-phase AC 261, which may also be referred to as the current injection and which corresponds to the current required to achieve the torque input T, is achieved more quickly (e.g., in one or two control cycles) than with prior current regulators. The operating point dependence refers to the fact that some parameters of the electric traction motor 260 (e.g., IPM) are operating point-dependent and change with current injection, as previously noted. Thus, according to one or more embodiments, terms (e.g., resistance R, inductance L) in the current regulator 220 or the transfer function that is used are changed based on the measured input current 245 provided to the electric traction motor 260. As a result, according to one or more embodiments, the current regulator 220 enables accurate current injection to the electric traction motor 260 by compensating for saturation and non-linearity.

FIG. 2 is a block diagram detailing aspects of the electric traction system 110, which includes a reduced control cycle current regulator 220 for the electric traction motor 260 according to one or more embodiments. The torque input T is provided to a controller 210 that generates direct-axis d and quadrature-axis q current commands $I^*_d$ and $P_q$, respectively. The controller 210 may implement a known maximum torque per ampere (MTPA) control strategy to generate and regulate the current commands $I^*_d$ and $P_q$. According to exemplary embodiments, the controller 210 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 3:
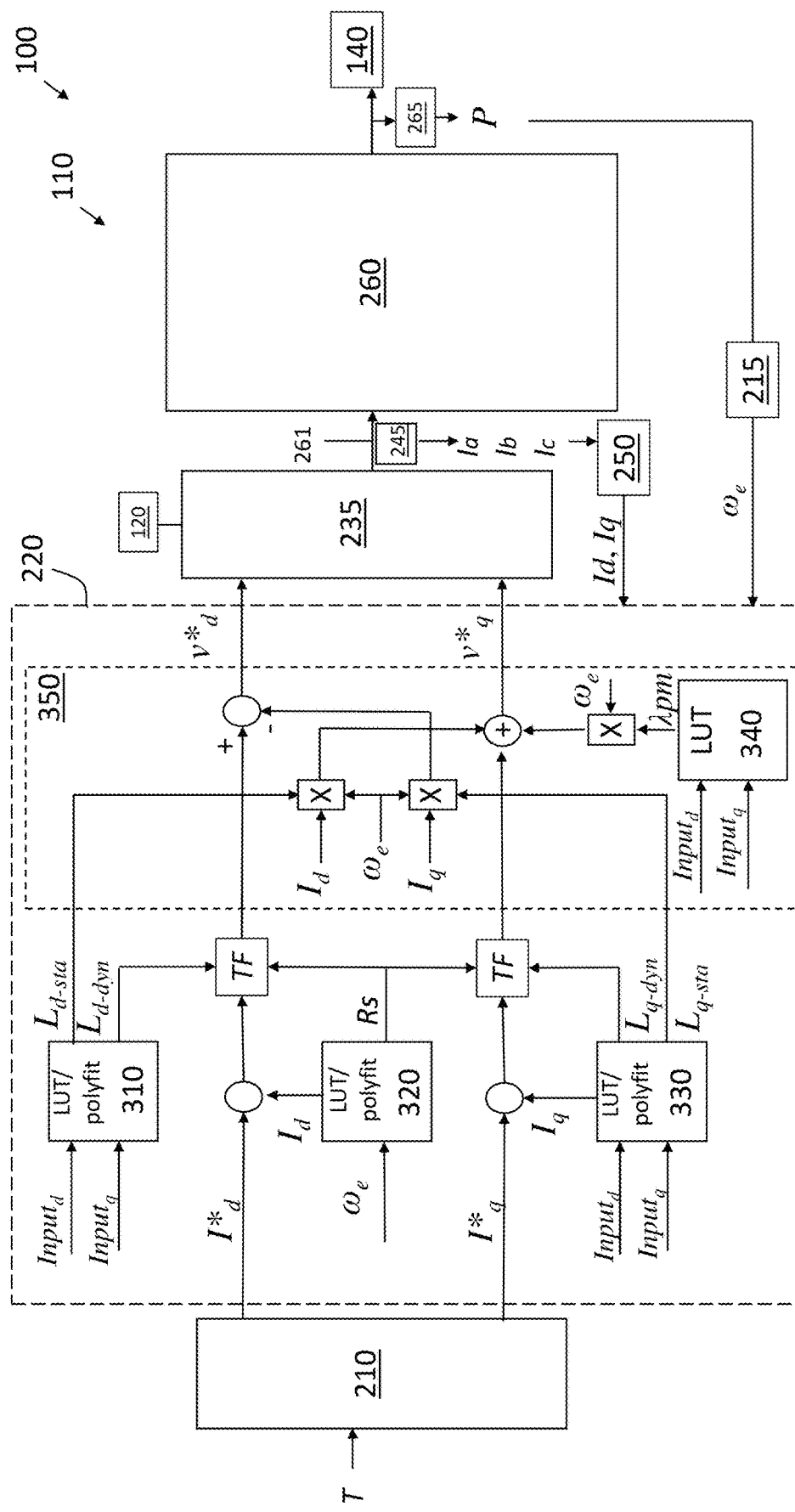
FIG. 3 is a schematic diagram of a reduced control cycle current regulator for the electric traction motor according to one or more embodiments.

The current regulator 220, which is further detailed in FIG. 3, generates direct-axis d and quadrature-axis q voltage commands $v^*_d$ and $v^*_q$ from the current commands $I^*_d$ and $I^*_q$. The PWM 230 converts from the direct-axis d and quadrature-axis q to three-phase and provides the voltage commands $v^*_d$ and $v^*_q$ as three-phase inverter voltage control signals to a direct current-to-alternating current (DC- AC) converter 240 that obtains the DC from the battery 120 and provides three-phase AC 261 to the electric traction motor 260. Together, the PWM 230 and DC-AC converter 240 may be regarded as serving the function of an inverter 235 of the electric traction system 110. The three-phase AC 261 from the DC-AC converter 240 (i.e., the three-phase AC 261 current injection to the electric traction motor 260) is tapped as current sensor signals $I_a$, $I_b$, $I_c$ by a sensor 245, as indicated in FIG. 2. The electric traction motor 260 then provides drive power to the transmission 140 based on the injected three-phase AC 261. That is, the electric traction motor 260 produces a torque and motion that is transmitted to the wheels of the vehicle 100. The shaft position P of the electric traction motor 260 is sensed by an electric traction motor shaft position sensor 265.

As FIG. 2 indicates, there are feedbacks provided to the controller 210, the current regulator 220, and the PWM 230. The current sensor signals $I_a$, $I_b$, $I_c$ that are measured by the sensor 245 at the input of the electric traction motor 260 are fed back to the current regulator 220 through a forward prediction filter 250. The forward prediction filter 250 converts the current sensor signals $I_a$, $I_b$, $I_c$ to direct-axis d and quadrature-axis q current signals. The forward prediction filter 250 also improves signal fidelity and predicts current signals $I_d$ and $I_q$ in the next control cycle. The shaft position P, which is provided by the electric traction motor shaft position sensor 265, is provided to the PWM 230 and to the forward prediction filter 250, which uses the shaft position P in converting the current sensor signals $I_a$, $I_b$, $I_c$ to direct-axis d and quadrature-axis q current signals. The shaft position P is also provided to a differentiator 215, which indicates shaft speed co, corresponding with the shaft position P. This shaft speed co, is used in both the controller 210 and the current regulator 220.

As detailed with reference to FIG. 3, a known transfer function may be used in the current regulator 220 to generate the voltage commands $v^*_d$ and $v^*_q$ from the current commands $I^*_d$ and $I^*_q$ provided by the controller 210. According to one or more embodiments, the inductance and resistance values that affect the transfer function output are adjusted to account for operating point-dependency of the electric traction motor 260, indicated by the predicted current signals $I_d$ and $I_q$. According to additional or alternate embodiments, the transfer function itself may be changed based on the feedback. Based on these modifications in current regulator 220 as compared with prior current regulation, less than two control cycles are needed to achieve the three-phase AC 261 that corresponds with the torque input T for injection into the electric traction motor 260. The three-phase AC 261 is used by the electric traction motor 260 to produce an electromagnetic torque. The application of this electromagnetic torque to the motor shaft results in mechanical torque sent to the transmission 140. The current regulator 220 controls the three-phase AC 261 directly, in one or two control cycles, to indirectly control the resulting electromagnetic torque required for the torque input T.

FIG. 3 is a schematic diagram of the reduced control cycle current regulator 220 for the electric traction motor 260 of the vehicle 100 according to one or more embodiments. As FIG. 2 indicates, the current regulator 220 obtains current commands $I^*_d$ and $I^*_q$ from the controller 210. In addition, the current regulator 220 obtains the forward predicted current signals $I_d$ and $I_q$ and shaft speed $\omega_e$ according to exemplary embodiments. These inputs are all shown in FIG. 3. The parameters $Input_d$ and $Input_q$ may differ according to alternate embodiments or from one control cycle to the next. According to an exemplary embodiment, $Input_d$ and $Input_q$ are the current commands $I^*_d$ and $I^*_q$ from the controller 210 used with LUTs or polynomial functions at blocks 310 and 330.

In alternate embodiments and/or in a subsequent control cycle, $Input_d$ and $Input_q$ are the resulting current signals $I_d$ and $I_q$ predicted for the next cycle by the forward prediction filter 250. In alternate embodiments and/or in a subsequent control cycle, $Input_d$ and $Input_q$ are the current signals $I_d$ and $I_q$ without forward prediction enabled. At block 310, the LUT or polynomial function provides static sta and dynamic dyn inductance L in the direct-axis d, $L_{d-sta}$ and $L_{d-dyn}$. At block 330, the LUT or polynomial function provides static sta and dynamic dyn inductance L in the quadrature-axis q, $L_{q-sta}$ and $L_{q-dyn}$. The inductance LUTs can have inductances from mapping and calibration of the motor with separate maps for $L_{d-sta}$, $L_{d-dyn}$, $L_{q-sta}$ and $L_{q-dyn}$. The LUTs could also be direct axis d and quadrature axis q flux tables from mapping and calibration of the motor, with inductances computed from flux and current according to known computations. At block 320, a LUT or polynomial function is implemented using the feedback of shaft speed $\omega_e$. This provides a resistance Rs.

The LUT or polynomial function at each block is based on measurements to determine operating point dependency of the electric traction motor 260. Interpolation between measured points may be used to complete the LUT. Up to four LUTs may be used at blocks 310 and 330, one to provide static or dynamic inductance values in the direct-axis d and one to provide static or dynamic inductance values in the quadrature-axis q.

As shown, the dynamic inductances $L_{d-dyn}$ and $L_{q-dyn}$ from blocks 310 and 330, respectively, and the resistance Rs from block 320 are input to each implementation of the transfer function TF. As previously noted, the transfer function TF may be any known closed loop transfer function such as a dead-beat controller. According to exemplary embodiments, the transfer function TF may be changed from one control cycle to the next. The dynamic inductances $L_{d-dyn}$ and $L_{q-dyn}$, from blocks 310 and 330 affect a term ($\tau$) in the dead-beat transfer function, shown below, while the resistance Rs from block 320 is used directly and in the term $\tau$:

$$\frac{\hat{R}_s(1 - e^{-T/\tau}z^{-1})}{1 - e^{-T/\tau} - (1 - e^{-T/\tau})z^{-1}} \qquad \text{EQ. 1}$$

When EQ. 1 is implemented in the direct axis d path, $\tau=\tau d=L_{d-dyn}/Rs$ and when EQ. 1 is implemented in the quadrature axis q path, $\tau=\tau q=L_{q-dyn}/Rs$.

By using the LUTs or polynomial functions at blocks 310, 320, and 330, the operating point dependency of the electric traction motor 260 is accounted for in the voltage commands $v^*_d$ and $v^*_q$ generated by the current regulator 220, which are ultimately provided as the three-phase AC 261 to the electric traction motor 260 for the next control cycle. As previously noted, the inclusion of blocks 310, 320, 330 with the model inverse transfer function inside the current regulator 220 to account for operating point dependency of terms in the electric traction motor 260 facilitates achieving the three-phase AC 261 provided to the electric traction motor 260 to achieve an electromagnetic torque that corresponds with the torque input T within one or two control cycles.

The static inductances $L_{d-sta}$ and $L_{q-sta}$ from blocks 310 and 330 are provided to a decoupling portion 350 of the current regulator 220 that mitigates cross-coupling effects of direct-axis d and quadrature-axis q currents as well as speed disturbance effects. The decoupling portion 350 is modified from prior deadbeat current regulation schemes by including the $L_{d\text{-}sta}$ and $L_{q\text{-}sta}$ from blocks 310 and 330 and is updated every control cycle to mitigate direct-axis d and quadrature-axis q current cross-coupling and to make the direct-axis d and quadrature-axis q current independently controlled. By including the LUT at block 340, the speed dependent disturbance is mitigated. Block 340 provides the motor rotor permanent magnet flux λpm to decouple the effects of back electromotive force (BEMF), which can act as a disturbance and cause speed dependent error in $I_d$ and $I_q$. The LUT based approach prevents this error and improves high speed dynamics of current and hence the torque control. The cross-coupling and BEMF are both motor operating point dependent and the current regulator 220 accounts for non-linearities and saturations of the electric torque motor 260 to decouple them accurately.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle, comprising:
   a current regulator configured to obtain current commands from a controller based on a torque input and provide voltage commands;
   an inverter configured to use the voltage commands from the current regulator and direct current (DC) supplied by a battery to provide alternating current (AC); and
   an electric traction motor configured to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;
   wherein the current regulator includes at least one of
   a) look-up tables or polynomial functions to provide inductance values to adjust the parameters of the transfer function based on the direct-axis current $I_d$ and the quadrature-axis current $I_q$ from the forward prediction filter or based on the current commands from the controller,
   b) look-up tables or polynomial functions to provide a resistance value to adjust the parameters of the transfer function based on the shaft speed of the electric traction motor, and
   c) a look-up table to mitigate speed dependent error in the control of direct-axis current $I_d$ and quadrature-axis current $I_q$.

2. The system according to claim 1, wherein the current regulator changes the transfer function based on the feedback.

3. The system according to claim 1, further comprising a forward prediction filter configured to obtain the feedback of the input to the electric traction motor and provide a prediction of direct-axis current $I_d$ and quadrature-axis current $I_q$ in a next control cycle to the current regulator.

4. The system according to claim 3, further comprising a differentiator configured to obtain the feedback of the output from the electric traction motor and provide a shaft speed of the electric traction motor to the controller and the current regulator.

5. The system according to claim 1, wherein the inverter includes a pulse width modulator (PWM) configured to convert the voltage commands from the current regulator to three-phase inverter voltage control signals.

6. The system according to claim 5, wherein the inverter also includes a DC to AC converter configured to obtain the three-phase voltage commands from the PWM and the DC from the battery to provide three-phase AC current to the electric traction motor.

7. A system in a vehicle, comprising:
   a current regulator configured to obtain current commands from a controller based on a torque input and provide voltage commands;
   an inverter configured to use the voltage commands from the current regulator and direct current (DC) supplied by a battery to provide alternating current (AC);
   an electric traction motor configured to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;
   a forward prediction filter configured to obtain the feedback of the input to the electric traction motor and provide a prediction of direct-axis current $I_d$ and quadrature-axis current $I_q$ in a next control cycle to the current regulator; and
   a differentiator configured to obtain the feedback of the output from the electric traction motor and provide a shaft speed of the electric traction motor to the controller and the current regulator;
   wherein the current regulator includes look-up tables or polynomial functions to provide inductance values to adjust the parameters of the transfer function based on the direct-axis current $I_d$ and the quadrature-axis current $I_q$ from the forward prediction filter or based on the current commands from the controller.

8. The system according to claim 7, wherein the look-up tables or the polynomial functions are based on measurements taken for the electric traction motor.

9. A system in a vehicle, comprising:
   a current regulator configured to obtain current commands from a controller based on a torque input and provide voltage commands;
   an inverter configured to use the voltage commands from the current regulator and direct current (DC) supplied by a battery to provide alternating current (AC);
   an electric traction motor configured to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;
   a forward prediction filter configured to obtain the feedback of the input to the electric traction motor and provide a prediction of direct-axis current $I_d$ and quadrature-axis current $I_q$ in a next control cycle to the current regulator; and a differentiator configured to obtain the feedback of the output from the electric traction motor and provide a shaft speed of the electric traction motor to the controller and the current regulator;

wherein the current regulator includes look-up tables or polynomial functions to provide a resistance value to adjust the parameters of the transfer function based on the shaft speed of the electric traction motor.

10. A system in a vehicle, comprising:
a current regulator configured to obtain current commands from a controller based on a torque input and provide voltage commands;
an inverter configured to use the voltage commands from the current regulator and direct current (DC) supplied by a battery to provide alternating current (AC);
an electric traction motor configured to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;
a forward prediction filter configured to obtain the feedback of the input to the electric traction motor and provide a prediction of direct-axis current $I_d$ and quadrature-axis current $I_q$ in a next control cycle to the current regulator; and
a differentiator configured to obtain the feedback of the output from the electric traction motor and provide a shaft speed of the electric traction motor to the controller and the current regulator;
wherein the current regulator includes a look-up table to mitigate speed dependent error in the control of direct-axis current $I_d$ and quadrature-axis current $I_q$.

11. A method in a vehicle, comprising:
configuring a current regulator to obtain current commands from a controller based on a torque input and provide voltage commands;
arranging an inverter to use the voltage commands from the current regulator and direct current (DC) supplied by a battery to provide alternating current (AC); and
positioning an electric traction motor to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;
wherein the configuring the current regulator includes at least one of
a) configuring look-up tables or polynomial functions to provide inductance values to adjust the parameters of the transfer function based on the direct-axis current $I_d$ and the quadrature-axis current $I_q$ from the forward prediction filter or based on the current commands from the controller,
b) configuring look-up tables or polynomial functions provides a resistance value to adjust the parameters of the transfer function based on the shaft speed of the electric traction motor, and
c) configuring a look-up table to mitigate speed dependent error in the control of direct-axis current $I_d$ and quadrature-axis current $I_q$.

12. The method according to claim 11, wherein the configuring the current regulator includes changing the transfer function based on the feedback.

13. The method according to claim 11, further comprising arranging a forward prediction filter to obtain the feedback of the input to the electric traction motor and to provide a prediction of direct-axis current $I_d$ and quadrature-axis current $I_q$ in a next control cycle to the current regulator.

14. The method according to claim 13, further comprising arranging a differentiator to obtain the feedback of the output from the electric traction motor and to provide a shaft speed of the electric traction motor to the controller and the current regulator.

15. The method according to claim 11, wherein the arranging the inverter includes arranging a pulse width modulator (PWM) to convert the voltage commands from the current regulator to three-phase inverter voltage control signals.

16. The method according to claim 15, wherein the arranging the inverter also includes arranging a DC to AC converter to obtain the three-phase voltage commands from the PWM and the DC from the battery to provide three-phase AC current to the electric traction motor.

17. A method in a vehicle, comprising:
configuring a current regulator to obtain current commands from a controller based on a torque input and provide voltage commands;
arranging an inverter to use the voltage commands from the current regulator and direct current (DC) supplied by a battery to provide alternating current (AC); and
positioning an electric traction motor to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;
arranging a forward prediction filter to obtain the feedback of the input to the electric traction motor and to provide a prediction of direct-axis current $I_d$ and quadrature-axis current $I_q$ in a next control cycle to the current regulator; and
arranging a differentiator to obtain the feedback of the output from the electric traction motor and to provide a shaft speed of the electric traction motor to the controller and the current regulator;
wherein the configuring the current regulator includes configuring look-up tables or polynomial functions to provide inductance values to adjust the parameters of the transfer function based on the direct-axis current $I_d$ and the quadrature-axis current $I_q$ from the forward prediction filter or based on the current commands from the controller.

18. The method according to claim 17, wherein the configuring the look-up tables or the polynomial functions includes basing the look-up tables or the polynomial functions on measurements taken for the electric traction motor.

19. A method in a vehicle, comprising:
configuring a current regulator to obtain current commands from a controller based on a torque input and provide voltage commands;
arranging an inverter to use the voltage commands from the current regulator and direct current (DC) supplied by a battery to provide alternating current (AC); and
positioning an electric traction motor to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;

arranging a forward prediction filter to obtain the feedback of the input to the electric traction motor and to provide a prediction of direct-axis current $I_d$ and quadrature-axis current $I_q$ in a next control cycle to the current regulator; and arranging a differentiator to obtain the feedback of the output from the electric traction motor and to provide a shaft speed of the electric traction motor to the controller and the current regulator;

wherein the configuring the look-up tables or polynomial functions provides a resistance value to adjust the parameters of the transfer function based on the shaft speed of the electric traction motor.

20. A method in a vehicle, comprising:

configuring a current regulator to obtain current commands from a controller based on a torque input and provide voltage commands;

arranging an inverter to use the voltage commands from the current regulator and direct current (DC) supplied by a battery to provide alternating current (AC); and positioning an electric traction motor to provide drive power to a transmission of the vehicle based on injection of the AC from the inverter, wherein the current regulator adjusts parameters of a transfer function implemented by the current regulator, based on feedback of an input to and an output from the electric traction motor to achieve the AC corresponding with the torque input;

arranging a forward prediction filter to obtain the feedback of the input to the electric traction motor and to provide a prediction of direct-axis current $I_d$ and quadrature-axis current $I_q$ in a next control cycle to the current regulator; and arranging a differentiator to obtain the feedback of the output from the electric traction motor and to provide a shaft speed of the electric traction motor to the controller and the current regulator;

wherein the configuring the current regulator includes configuring a look-up table to mitigate speed dependent error in the control of direct-axis current $I_d$ and quadrature-axis current $I_q$.

* * * * *